Patented Aug. 9, 1932

1,870,455

UNITED STATES PATENT OFFICE

HERBERT HÖNEL, OF VIENNA, AUSTRIA, ASSIGNOR TO BECK, KOLLER & COMPANY, INC., OF DETROIT, MICHIGAN, A CORPORATION OF DELAWARE

ARTIFICIAL MASS AND PROCESS OF MAKING THE SAME

No Drawing.          Application filed June 7, 1930. Serial No. 459,845.

The invention relates to improvements in artificial resinlike masses and in the process of making the same.

The present application is a continuation in part of my application Serial No. 454,186, filed May 20, 1930, and of my application Serial No. 362,460, filed May 11, 1929, now Patent No. 1,800,296, dated April 14, 1931.

Phenol alcohols, when heated at temperatures between 120 to 180° C., condense, as is known, to form hard infusible insoluble resinous masses, mostly by splitting off of formaldehyde. It has been found that phenol alcohols heated together with bodies of the general formula

$$HOOC.R.COOC_nH_{(n+2)}(OH)_{(n-1)}$$

(—where R represents a polyvalent hydrocarbon radicle—) create a uniform reaction mass without splitting off of formaldehyde in any substantial quantities. According to the proportions used, the resulting product is either still soluble or swells in solvents and is gelatinous and constitutes a hygroscopic mass. In any case the product is uniform and clear. It has also been found that the gelatinization which occurs at higher temperatures when using large quantities of phenol alcohol does not take place if suitable amounts of a high molecular monobasic carboxylic acid are present. These amounts may desirably be added to the reacting mass just as the coagulation begins. In some cases it is even possible to dissolve a mass which is insoluble in the common solvents in said carboxylic acids under heat. For this reaction fresh natural resinous acids and the fatty acids of castor oil are most suitable, while other fatty acids such as are obtained from natural fats or from drying or semi-drying or non-drying fatty oils show this quality in a lesser degree.

If the total reacting mass is now subjected to esterification eventually, after addition of further amounts of a polybasic alcohol, very high molecular, high colloidal bodies are obtained, which serve as highly satisfactory bases for varnishes and similar finishes. It is necessary that a sufficient amount of monobasic carboxylic acids be added to the reacting mass, otherwise coagulation may again occur during the esterification. These monobasic carboxylic acids can be wholly or partly substituted by their natural glycerides.

The commercial advantages of said process are that through the use of comparatively small amounts of certain herein described bodies the low priced natural raw materials of the varnish industry can be transformed into highly valuable commercial products. Low grade drying or semi-drying oils can be used with good results, particularly at elevated temperatures.

By phenol alcohols I mean more or less low molecular condensation products obtained from phenols and an aldehyde such as formaldehyde by means of alkali catalysts according to well known methods.

I may use in my process common phenols or technical phenol mixtures which have preferably all the particularly reactive positions unsubstituted. These phenols generally represent the cheapest types and produce the highest yields, but it will be understood that other phenolic bodies, such, for example, as those described in my aforesaid Patent 1,800,296, may be employed, with good results.

The previously mentioned body

$$HOOC.R.COOC_nH_{(n+2)}(OH)_{(n-1)}$$

or its isomeres or a mixture containing such bodies as the principal constituents is obtained most easily by heating the anhydride of a dibasic carboxylic acid for a short time with a polyhydric alcohol in approximately equimolecular proportions to 150–180° C. until a drop stays clear when cold without showing crystalline turbidity. The acid number of this oily or semi-solid mass indicates that it is an acid mono-ester, the production of which is apparently analagous to the already known production of acid esters of monovalent alcohols.

Dibasic acids themselves may be used as the starting ingredient and the esterification is continued until the acid number is about in accordance with that of the mono-ester. The further esterification can also be carried out in the presence of the monobasic carboxylic acids, as their esterification takes place comparatively much more slowly. This can be especially true of natural resin acids. If only a small part of the monobasic acid reacts with an alcoholic group of said monoester of a dibasic or polybasic carboxylic acid and a polyhydric alcohol, this fact will not influence the process in principle. In some cases it is desirable that the reacting mass on which the phenol alcohol reacts should be a uniform mixture under heat.

The reaction between natural resins and phenol alcohols of general type is already known, but in such prior processes only a comparatively small quantity of the phenol alcohols could be employed. The use of a larger quantity resulted in the creation of useless sago-like or crumbling masses which were undesirable, while a reaction with the rosin did not take place. On the other hand, the amounts of phenol alcohols as compared with the resin acids may be increased considerably, according to my process, possibly to a multiple of the quantity previously usable, without the slightest formation of said sago-like particles. It should be mentioned that the process is not limited to the presence of fresh natural resin acids, and I have discovered the surprising fact that phenol alcohols obtained from phenols even with three particularly reactive positions in the molecule can react with higher fatty acids in the presence of said mono-ester of a dibasic or polybasic carboxylic acid and a polyhydric alcohol without the formation of the sago-like masses. Even the presence of a considerable amount of the glyceride itself does not cause the phenol alcohol of the mentioned character to react with itself and to create sago-like masses.

With certain restrictions, results may be obtained by my present process similar to those described in my Patent 1,800,296, such as advantageously changing the character of China wood oil. When larger amounts of a glyceride of a fatty acid are present, phenol alcohols of all types of phenols cannot be used, but only those with two particularly reactive positions in the molecule, as explained in my aforesaid patent. These phenol alcohols can be incorporated in the reacting mass at any time, i. e. even when the acid number of the mass is still comparatively high, after which the esterification can be started or continued. Or, phenol alcohols of this type may be incorporated after having reached a low acid number in the limited sense of the process in my patent. When the acid number of the mass is still relatively high, which indicates the presence of said mono-ester of a dibasic or polybasic carboxylic acid and a polyhydric alcohol the employed phenol alcohols may also be obtained from phenol mixtures which contain as main constituents phenols with only two particularly reactive positions and as subordinate constituents phenols of a general type, i. e. crude technical products; for example, crude o-cresol can be used.

The products obtained according to my improved process as such constitute excellent bases for varnish-like products. The application and uses of these conform with those of the usual type. Several examples may explain the process:

*Example 1.*—100 parts phthalic anhydride (99%), 63 parts glycerine (98%) are heated together to 160–170° C. In the beginning a sample will cloud immediately when cold through formation of microscopic crystals. After 10 to 15 minutes a sample will stay clear when cold. The reacting product has an acid number of approximately 228, which conforms exactly with the acid number of the mono-ester. 60 parts of linseed oil fatty acids and 60 parts of American rosin M are then added and melted. Under constant stirring at 160–180° C. a liquid condensation product obtained from 35 parts of a technical mixture of m-p-cresol and 40 parts of formaldehyde (40 volume %) are slowly added. Before reacting with the phenol alcohol, the mono-phthalate ester on the one hand, and the rosin and fatty acids on the other hand are only partly soluble in each other, and after being stirred form two separable layers, but on incorporation of the phenol alcohol an apparently complete chemical reaction takes place between the constituents and a uniform mass results. The temperature is now increased and at 200° C., 120 parts of linseed oil are slowly added, at the same time being careful that the reacting mass always stays clear when hot. The temperature is then increased to 280° C., and held for several hours at this temperature, during which period the viscosity of the product increases owing to the presence of polymerizing fatty acid groups. The product is soluble in aromatic hydrocarbons or in mixtures of these with aliphatic hydrocarbons, and dries with a sufficient amount of driers to a very hard varnish. A turbidity is noticed in the reacting mass when an acid number of approximately 30 is reached. This turbidity soon concentrates to little glossy flakes, while the mass was absolutely clear at higher acid numbers. These flakes can be fully dissolved through the addition of a little glycerine. In a solution of this product the flakes settle out readily. It should be mentioned that after the reaction with the phenol alcohols practically no phthalic anhydride sublimes out of the hot mass, while a reacting mass made from the same starting materials but without phenol alcohol will sublime phthalic anhydride to a considerable extent.

*Example 2.*—100 parts phthalic anhydride, 80 parts glycerine, 400 parts American wood rosin I are heated together up to 160–170° C. until a sample shows an acid number of approximately 180. Now incorporate a thin flowing condensation product made from 100 parts of USP cresol and 130 parts of formaldehyde (40 volume %) mixed with 10 parts of glycerine at a temperature of 160–200° C., accompanied by vigorous stirring. The melt will become so viscous that it is advisable to add approximately 100 parts of China wood oil or the fatty acids of the same and a corresponding amount of glycerine during the incorporation of the phenol alcohols. Now add 350 parts linseed oil and additional 50 parts of China wood oil and esterify the total mass at a temperature from 240–270° C. at which occasion probably re-esterification takes place. The formation of flakes decribed in Example 1 is here more prominent after reaching lower acid numbers than in Example 1, and can also be done away with by the addition of glycerine. Though this varnish contains a considerable amount of China wood oil, it dries also at considerably increased temperature to a smooth film.

*Example 3.*—Substitute in Example 2 300 parts of linseed oil by 300 parts of castor oil. It is to be noted that turbidity and formation of flakes is not noticed in this case. This mass also produces a hard and tough drying varnish with driers.

*Example 4.*—100 parts of phthalic anhydride, 70 parts of glycerine are heated together as in Example 1. Add 400 parts of castor oil fatty acids, which can be mixed clear with the reaction product of phthalic anhydrides and glycerine. Add a phenol alcohol obtained from 60 parts of cresol USP and 90 parts of formaldehyde (30%) and cause it to react at usual temperatures. Afterwards add 30 parts of glycerine and esterify at temperatures from 200–240° C. A clear brown viscous mass is obtained which can be used as a base for varnishes, etc., and dries after the addition of driers at elevated temperatures to a very elastic film.

About half the amount of the fatty acids can be substituted by the castor oil itself.

*Example 5.*—50 parts of maleic anhydride, 50 parts of glycerine are heated for several minutes at about 160° C. until a clear oily product is obtained which has an acid number of about 280. 500 parts of American wood rosin and 100 parts of China wood fatty acids are melted and combined with the above reaction product. A liquid condensation product obtained from 120 parts of cresol USP and 160 parts of formaldehyde (40 volume %) is caused to react by stirring together with the above ingredients. When the reacting mass appears uniform when hot, add 100 parts of China wood oil and 550 parts of linseed oil and an additional 55 parts of glycerine and esterify the whole reaction mass. The resulting product has excellent properties as a base for varnishes, etc.

It should be mentioned that in the absence of the small amount of the acid maleic ester only about half of the phenol alcohol can react with the rosin used. An increase in quantity is useless and undesirable, owing to the formation of sago-like masses. In the presence of China wood oil fatty acids even smaller amounts of phenol alcohol will cause said appearance.

*Example 6.*—40 parts camphoric acid, 20 parts glycerine, 120 parts American or French rosin N, 30 parts corn oil fatty acids are heated together to 170–180° C. until an acid number of about 180–190 is reached. Incorporate as previously described in the other examples a liquid condensation product obtained from 30 parts of phenol and 42 parts of formaldehyde (30%), further add 12 parts of glycerine and 80 parts of corn oil. Raise the temperature gradually to 280° C. and hold it until a sample shows rubber-like consistency. The product is soluble in petroleum hydrocarbons and is very useful as a base for enamels, etc.

*Example 7.*—60 parts maleic (fumaric) acid, 60 parts glycerine, and 500 parts American rosin are heated under stirring to about 180° C. until a uniform reaction product is obtained when heated. It shows an acid number of about 165; this means that about $\frac{1}{10}$ of the acid rosin has combined with free hydroxyl groups. It has been found as advantageous to carry out the reaction to this stage before introducing the phenol alcohol used in this example, as otherwise it is difficult to get a combination of the two layers. Now a phenol alcohol is incorporated which is obtained from 125 parts of crude mercantile phenol and 140 parts of formaldehyde (40 volume %) to which is added 95 parts of glycerine at about 180°–200° C. When about one-half of the phenol alcohol has been introduced and reacted, 100 parts of linseed oil fatty acids are added in order to make the reacting mass of lower viscosity and to avoid any coagulation, and 200 more parts of linseed oil fatty acids as above used are again added after the phenol has been incorporated. When the mass has reached an acid number of about 130, it will be clear also at lower temperatures. 400 parts of linseed oil and 400 parts of China wood oil are now added and the whole mixture is caused to react with phenol alcohols obtained from 80 parts of crude o-cresol (melting point 25° C.) and 90 parts of formaldehyde (40 volume %) at about 180–200° C. Afterwards the esterification is carried out at 240° C. In spite of the high amount of China wood oil and the unusually low temperature employed in the process, the resulting mass produces also at elevated temperatures a clear, smooth and very tough film.

It will be noted that in the foregoing example relatively large quantities of neutral oils are present before the second incorporation of phenols.

This phenol alcohol has been obtained from crude o-cresol which contains as subordinate constituents phenol and m-cresol, i. e. phenol bodies with three particularly reactive positions. Phenol alcohols obtained from phenols of the latter type as main constituents could not be employed in this case.

The foregoing description and above examples are given by way of illustration only and not by way of limitation. It will be understood that any well known equivalents of the starting ingredients may be employed. For example, in place of glycerine, ethylene glycol may be employed. Likewise, while dibasic carboxylic acids have been particularly referred to, such as maleic, phthalic and camphoric acids, nevertheless other polybasic acids such as citric acid may be employed within the scope of the invention, particularly in combination with the other acids named. Further, while vegetable oils have been mentioned as typical fatty oils, other fatty oils such as fish oil may be employed. Also the fatty acids or their natural glycerides of saturated character may be used.

By relatively low molecular polybasic carboxylic acids I have reference to carboxylic acids such as succinic, maleic, adipic, phthalic, camphoric, and citric which are crystalline in character as distinguished from relatively high molecular monobasic and polybasic acids such as natural resinous acids or fatty acids of either unaltered or polymerized natural glycerides having more or less colloidal properties as disinguished from crystalline.

What I claim is:

1. A new composition of matter formed by the reaction of (1) a high molecular monobasic carboxylic acid, (2) a member of a group which consists of relatively low molecular polybasic carboxylic acids and anhydrides, (3) a polyhydric alcohol, (4) a phenol alcohol and (5) a natural glyceride of a high molecular monobasic carboxylic acid.

2. A process of producing artificial masses which comprises reacting together (1) a high molecular monobasic carboxylic acid, (2) a member of a group which consists of relatively low molecular polybasic carboxylic acids and anhydrides, (3) a polyhydric alcohol, (4) a phenol alcohol and (5) a natural glyceride of a high molecular monobasic carboxylic acid.

3. A new composition (1) of matter formed by the reaction of a high molecular monobasic carboxylic acid, (2) a member of a group consisting of relatively low molecular polybasic carboxylic acids and anhydrides, (3) a polyhydric aliphatic alcohol, (4) a phenol alcohol and (5) a fatty oil of the drying or semi-drying type.

4. A process of making a new composition of matter which comprises reacting together (1) a high molecular monobasic carboxylic acid, (2) a member of a group consisting of relatively low molecular polybasic carboxylic acids and anhydrides, (3) a polyhydric aliphatic alcohol, (4) a phenol alcohol and (5) a fatty oil of the drying or semi-drying type.

5. The process as defined in claim 4 in which fatty oils are added while the phenol alcohol is reacting.

6. The process as defined in claim 4 in which fatty oils are combined with the reacting mass after the phenol alcohols have reacted.

7. The process as defined in claim 4 in which fatty oils are added before the phenol alcohol has reacted.

8. A new artificial resin-like mass comprising the reaction product of (1) a natural glyceride of a high molecular monobasic carboxylic acid (2) a member of a group consisting of relatively low molecular polybasic carboxylic acids and anhydrides, (3) a polyhydric alcohol, and (4) a phenol alcohol.

9. A process of producing artificial masses which comprises reacting together (1) a natural glyceride of a high molecular monobasic carboxylic acid, (2) a member of a group consisting of relatively low molecular polybasic carboxylic acids and anhydrides, (3) a polyhydric alcohol, and (4) a phenol alcohol.

10. A new composition of matter formed by the reaction of (1) a high molecular monobasic carboxylic acid, (2) a member of a group which consists of relatively low molecular polybasic carboxylic acids and anhydrides, (3) a polyhydric alcohol, (4) a phenol alcohol and (5) drying oils.

11. A process of making artificial masses which comprises reacting together (1) a high molecular monobasic carboxylic acid, (2) a member of a group which consists of relatively low molecular polybasic carboxylic acids and anhydrides, (3) a polyhydric alcohol, (4) a phenol alcohol and (5) drying oils.

12. A new composition of matter formed by the reaction of (1) a high molecular monobasic carboxylic acid, (2) a member of a group which consists of relatively low molecular polybasic carboxylic acids and anhydrides, (3) a polyhydric alcohol, (4) a phenol alcohol and (5) China wood oil.

13. A process of making artificial masses which comprises reacting together (1) a high molecular monobasic carboxylic acid, (2) a member of a group which consists of relatively low molecular polybasic carboxylic acids and anhydrides, (3) a polyhydric alcohol, (4) a phenol alcohol and (5) China wood oil.

14. A new composition of matter formed by the reaction of (1) a high molecular monobasic carboxylic acid, (2) a member of a group which consists of relatively low molecular polybasic carboxylic acids and anhydrides, (3) a polyhydric alcohol, (4) a phenol alcohol, (5) linseed oil and (6) China wood oil.

15. A process of making artificial masses which comprises reacting together (1) a high molecular monobasic carboxylic acid, (2) a member of a group which consists of relatively low molecular polybasic carboxylic acids and anhydrides, (3) a polyhydric alcohol, (4) a phenol alcohol, (5) drying oils other than China wood oil and (6) China wood oil.

16. A new composition of matter formed by the reaction of (1) a high molecular monobasic carboxylic acid, (2) a member of a group which consists of relatively low molecular polybasic carboxylic acids and anhydrides, (3) a polyhydric alcohol, (4) a phenol alcohol and (5) castor oil.

17. A process of making artificial masses which comprises reacting together (1) a high molecular monobasic carboxylic acid, (2) a member of a group which consists of relatively low molecular polybasic carboxylic acids and anhydrides, (3) a polyhydric alcohol, (4) a phenol alcohol and (5) castor oil.

18. A new composition of matter formed by the reaction of (1) a high molecular monobasic carboxylic acid, (2) a member of a group which consists of relatively low molecular polybasic carboxylic acids and anhydrides, (3) a polyhydric alcohol, (4) a phenol alcohol, (5) castor oil and (6) China wood oil.

19. A process of making artificial masses which comprises reacting together (1) a high molecular monobasic carboxylic acid, (2) a member of a group which consists of relatively low molecular polybasic carboxylic acids and anhydrides, (3) a polyhydric alcohol, (4) a phenol alcohol, (5) castor oil and (6) China wood oil.

In testimony whereof I affix my signature.

HERBERT HÖNEL.